(12) United States Patent  
Nagatsuma et al.

(10) Patent No.: US 8,139,128 B2  
(45) Date of Patent: Mar. 20, 2012

(54) IMAGE CAPTURE DEVICE AND IMAGE PROCESSING METHOD FOR THE SAME

(75) Inventors: Hiroshi Nagatsuma, Nagoya (JP); Yasuo Masui, Nishikamo-gun (JP); Tadamasa Nakamura, Nagoya (JP); Nobuhiro Ando, Toyota (JP)

(73) Assignee: Elmo Company, Limited (JP)

( * ) Notice: Subject to any disclaimer, the term of this patent is extended or adjusted under 35 U.S.C. 154(b) by 413 days.

(21) Appl. No.: 12/511,694

(22) Filed: Jul. 29, 2009

(65) Prior Publication Data

US 2010/0026861 A1 Feb. 4, 2010

(30) Foreign Application Priority Data

Jul. 31, 2008 (JP) ................................ 2008-197786

(51) Int. Cl.  
*H04N 9/64* (2006.01)

(52) U.S. Cl. ........................................................ 348/274

(58) Field of Classification Search .................. 348/247, 348/246  
See application file for complete search history.

(56) References Cited

U.S. PATENT DOCUMENTS

| | | | | |
|---|---|---|---|---|
| 5,854,655 A | * | 12/1998 | Watanabe et al. | 348/247 |
| 6,642,961 B1 | * | 11/2003 | Hsieh | 348/247 |
| 7,006,136 B1 | * | 2/2006 | Hsieh | 348/247 |
| 7,292,213 B2 | * | 11/2007 | Shen | 348/247 |
| 7,755,680 B2 | * | 7/2010 | Watanabe | 348/247 |
| 7,864,231 B2 | * | 1/2011 | Sakamoto | 348/247 |
| 7,944,488 B2 | * | 5/2011 | Post | 348/247 |
| 2003/0007081 A1 | * | 1/2003 | Kwon et al. | 348/247 |
| 2004/0080636 A1 | * | 4/2004 | Dong | 348/247 |
| 2005/0078204 A1 | * | 4/2005 | Matsuoka et al. | 348/247 |
| 2008/0239112 A1 | * | 10/2008 | Naito | 348/246 |
| 2008/0297629 A1 | * | 12/2008 | Kitani | 348/247 |
| 2009/0195677 A1 | * | 8/2009 | Noh | 348/247 |

FOREIGN PATENT DOCUMENTS

| | | | | |
|---|---|---|---|---|
| JP | 07162757 A | * | 6/1995 | |
| JP | 2006-100913 | | 4/2006 | |
| JP | 2006324874 A | * | 11/2006 | |
| JP | 2007181064 A | * | 7/2007 | |
| JP | 2007228269 A | * | 9/2007 | |

* cited by examiner

*Primary Examiner* — John Villecco  
(74) *Attorney, Agent, or Firm* — Ostrolenk Faber LLP

(57) ABSTRACT

The image capture device includes defect information storage unit in which defective pixel data is stored in advance; signal conversion unit adapted to covert pixel values of an image signal output from image capture unit to pixel values from which defective values are excluded; a defective pixel establishing unit, an image signal storage unit for storing defective values in terms of frame units chronologically and in order of address; and second comparison unit. The first comparison unit acquires defective pixel data in frame units in several increments from the defect information storage unit and compares the data with the image signal; once all of the defective pixel data has been acquired and compared, comparison of the image signal data and the defective pixel data will stop, and a comparison process will be carried out by the second comparison unit.

6 Claims, 3 Drawing Sheets

IMAGE CAPTURE DEVICE AND IMAGE PROCESSING METHOD FOR THE SAME

This application claims the benefit of and priority from Japanese Application No. 2008-197786 filed Jul. 31, 2008, the content of which is incorporated herein by reference.

BACKGROUND OF THE INVENTION

1. Field of the Invention

The present invention relates to an image capture device and defective pixel detection device adapted to detect, from a plurality of pixels making up the pixels of an image captured by an image capture device, defective pixels that may result for example from improper operation of an image capture element provided to the imaging device; and to a marking device for an image capture device.

2. Description of the Related Art

Image capture devices such as digital still cameras and digital video cameras have come to enjoy widespread use in recent years. Such image capture devices employ image capture elements that are adapted to convert light received via a lens into an electrical signal. CCD (Charge Coupled Device), CMOS (Complementary Metal Oxide Semiconductor) sensors, and the like are commonly used image capture elements of this kind. Such image capture elements are furnished with a plurality of photodetector elements (photodiodes) corresponding to the plurality of pixels that make up the photographed image, and are adapted to output image data that represents a respective pixel value of each pixel. When an image taken by an image capture device is displayed on a display device, if for example any of the photodetector elements should experience improper operation during shooting, resulting in output of pixel data of a higher value than the correct value for output, the pixel corresponding to the photodetector element in question may appear as a so-called bright defect, whereas if pixel data of a lower value than the correct value for output is output, the pixel corresponding to the photodetector element in question may appear as a so-called dark defect.

In order to correct through signal processing the image degradation that can result from such defective pixel image data, it was conventional practice at the semiconductor production facility to detect and save to nonvolatile memory beforehand defective pixel data for any defective pixels contained in an image capture element; and during normal shooting to determine, using a comparator circuit on the basis of addresses stored in the nonvolatile memory, whether current pixel data is associated with a defective pixel, and if determined to be associated with a defective pixel, to then perform correction of the defective pixel, for example, through substitution of the image capture output for the previous pixel in place of the image capture output for the defective pixel defective pixel as disclosed in JP-A 2006-100913.

Pixel counts required by more recent image capture elements have now reached a million or more pixels, up from several hundred thousand pixels in previous models, and despite advances in image capture element production technology, the number of defective pixels appearing in image capture elements has tended to increase accordingly.

For this reason, the scale of the comparator circuit has become larger in association with the increased the number of defective pixels. This has not only resulted in larger scale of the comparator circuit, but also led to the problem of delayed processing time and degraded image quality due to the larger number of determinations needing to be made.

SUMMARY

An advantage of some aspects of the invention is to provide an image capture device defective pixel detection device furnished with comparing unit of simple design; as well as a marking device for an image capture device.

According to an aspect of the invention, the invention is provided with an image capture device comprising: an image capture unit having an image capture element for capturing a subject, and adapted to output an image signal with pixel values output by the image capture element in a form associated with addresses of the image capture element; a pixel address storage unit adapted to store a number n of addresses in the image capture element, where n is an integer an integer equal to or more than two; a number m of comparators adapted to acquire the stored n addresses in multiple increments of m, and during each acquisition to repeatedly carry out a comparison process for comparison of the m addresses with the addresses of the image signal output by the image capture unit, for the image signal of at least one frame, where $1 \leq m < n$; and an image signal storage unit adapted to save default values as values lying out of range of the pixel values output by the image capture element and as image data of at least one frame, wherein the default values are values in which the m comparators determine that addresses saved in the comparators match addresses of the image signal captured by the image capture element until acquisition of the n addresses has been completed.

In the image capture device according to the first mode, an image signal composed of pixel values output by the image capture element is output in a form associated with addresses of the image capture element. The pixel address storage unit then saves the associated pixel values at the n addresses. The m comparators will then acquire in multiple increments the addresses and pixel values that have been saved to the pixel address storage unit and compare them across a pixel signal equivalent to at least one frame. The image signal storage unit will then repeatedly acquire pixel values until acquisition of the n addresses has been completed and will save the acquired values as image data of at least one frame, while during each acquisition by the m comparators, designating those pixel values determined by the comparators to have matching addresses among the pixel values in the image signal output by the image capture unit to be values lying out of range of the pixel values output by the image capture element.

Consequently, the m comparators will extract image capture element-associated pixel values in several increments rather than extracting the defective pixel data all at once, making it possible for the comparators to have simple design.

A second mode of the invention provides a defective pixel detection device for an image capture device comprising: an image capture unit having an image capture element for outputting a first image signal taken of a subject; a defect information storage unit adapted to store defective pixel data representing defective pixels of the image capture element in advance, wherein the defective pixel data is in the form of address and defective value of the image capture element; a signal conversion unit adapted to convert a first pixel value of the first image signal to a second pixel value of a second image signal, wherein the second pixel value excludes the defective value; a first comparison unit having comparators, wherein each of the comparators loads and extracts the defective pixel data stored in the defect information storage unit respectively, and then compares the extracted defective pixel data with the second image signal of the signal conversion unit, and converts the second pixel value of the second image signal to the defective value when the second image signal matches the defective pixel data; an image signal storage unit adapted to save the defective value output from the first comparison unit in frame units chronologically and in order of address; and a second comparison unit adapted to carry out a comparison process, in which the second comparison unit compares chronologically and in order of address between the defective value saved in the image signal storage unit and the second pixel value of the second image signal, and converts the second pixel value to the defective value when the second pixel value mates the defective value at each of the address. The first comparison unit carries out a default data setting process, in which the first comparison unit acquires the defective pixel data in frame units and in multiple increments from the defect information storage unit, and upon completion of acquisition and comparison process of all the defective pixel data, the first comparison unit halts comparison of the second image signal data with the defective pixel data, and in sequence of the default data setting process, the second comparison unit carries out the comparison process.

In the image capture device according to the second mode, defective pixels of image capture element are scanned in advance and are thereby stored in advance in the defect information storage unit as defective pixel data that includes addresses and defective values of the image capture element. The defective pixel data that has been stored in the defect information storage unit is then extracted by the comparator of the first comparison unit. Meanwhile, the image signal from the image capture unit is input to the first comparison unit once processed by the signal conversion unit, and is compared by the comparator of the first comparison unit. Specifically, the signal conversion unit converts the pixel values of the image signal output by the image capture unit to pixel values from which defective values have been excluded, for output to the first comparison unit. The first comparison unit will then extract the unit of the defective pixel data that has been saved beforehand to the defect information storage unit, compare the defective pixel data with the pixel values of the image signal from the signal conversion unit, and if decided that a pixel value is a defective value of the defective pixel data, will modify the pixel value to a defective value with a marking unit. Defective values output from the marking unit will be saved to the image signal storage unit in frame units chronologically and order of address. The first comparison unit will acquire the defective pixel data from the defect information storage unit in frame units in several increments and compare the data with the image signal, ultimately acquiring all of the defective pixel data and storing all of it chronologically and order of address in one frame in the image signal storage unit. The first comparison unit will then halt the comparison process when all of the defective pixel data has been saved to the image signal storage unit. The second comparison unit will compare chronologically and in order of address the defect values that were saved to the image signal storage unit and the pixel values of the image signal output by the image capture element; and when a pixel value of the pixel signal at a given address is a defective value, will modify the pixel value to the defective value for output.

Since the first comparison unit extracts defective pixel data in several increments rather than extracting the defective pixel data all at once, it is possible for the comparator to have simple design.

Moreover, because a comparison process by the first comparison unit, which would require prolonged processing time proportional to the number of defective pixel data items, does not take place subsequent to completion of saving of the defective pixel data to the image signal storage unit, that is, since a process whereby the second comparison unit alone compares chronologically and in order of address the defective values that have been saved to the aforementioned image signal storage unit with the pixel values of the image signal output by the aforementioned image capture element will suffice, delay in signal process of the image signal can be reduced, and picture quality improved.

In a third mode, the defective pixel data that is saved to the defect information storage unit is divided into groups that are intended to be read out sequentially starting from the image capture element defects with higher luminance values. Here, where defective pixels are assumed to be bright defects or dark defects for example, a high luminance value refers to a bright defect. Through this design, correction will take place successively starting from defective pixels that tend to stand out in the image displayed by the image capture device, so that a clean image free from noticeable defects can be obtained after startup.

A fourth mode of the invention provides a marking device for an image capture device comprising: an image capture unit having an image capture element for outputting a first image signal taken of a subject; a marking information storage unit adapted to store making data representing marking pixels of the image capture element in advance, wherein the making data is in the form of address and marking values of the image capture element; a signal conversion unit adapted to convert a first pixel value of the first image signal to a second pixel value of a second image signal, wherein the second pixel value excludes the marking values; a first comparison unit having comparators, wherein each of the comparators loads and extracts the marking data stored in the marking information storage unit respectively, and then compares the extracted marking data with the second image signal of the signal conversion unit, and converts the second pixel value of the second image signal to the marking value when the second image signal matches the marking data; an image signal storage unit adapted to save the marking value output from the first comparison unit in frame units chronologically and in order of address; and a second comparison unit adapted to carry out a comparison process, in which the second comparison unit compares chronologically and in order of address between the marking value saved in the image signal storage unit and the second pixel value of the second image signal, and converts the second pixel value to the marking value when the second pixel value mates the marking value at each of the address. The first comparison unit carries out a default data setting process in which the first comparison unit acquires the marking pixel data in frame units and in multiple increments from the defect information storage unit, and upon completion of acquisition and comparison process of all the marking pixel data, the first comparison unit halts comparison of the second image signal data with the marking pixel data, and in sequence of the default data setting process, the second comparison unit carries out the comparison process.

According to the fourth mode, in place of defective values of defective pixels, by instead saving in advance to the marking information storage unit marking values that are intended to be incorporated as information in a picture, information can be appended to an image by a simple arrangement.

These and other objects, features, aspects, and advantages of the present invention will become more apparent from the following detailed description of the preferred embodiments with the accompanying drawings.

BRIEF DESCRIPTION OF THE DRAWINGS

DESCRIPTION OF THE PREFERRED EMBODIMENTS (1) Configuration of Image Capture Device FIG. 1 is an illustration depicting a schematic configuration of an image capture device 10 according to one embodiment of the present invention. The image capture device 10 includes image capture unit 12, a defective pixel establishing unit 20, second comparison unit 42, an inter-frame comparator circuit 39, an image signal storage unit 40, a defective pixel correction unit 44, a data processing unit 50, and an output unit 60. As will be discussed later, an image signal of a subject captured by the image capture unit 12 can be corrected on the basis of defective pixel data that has been saved beforehand. The image capture device 10 in the present embodiment is constituted by hardware; however, units could instead be constituted by software. While not illustrated in the drawing, the image capture device 10 will also be provided with a display unit such as a liquid crystal panel for displaying captured images; and with a recording unit for saving captured images to a recording medium such as a flash memory. The image capture device 10 also has a CPU, RAM, ROM and the like, and is equipped with a control unit (not shown) for controlling the various parts of the image capture device 10.

Figure 1:
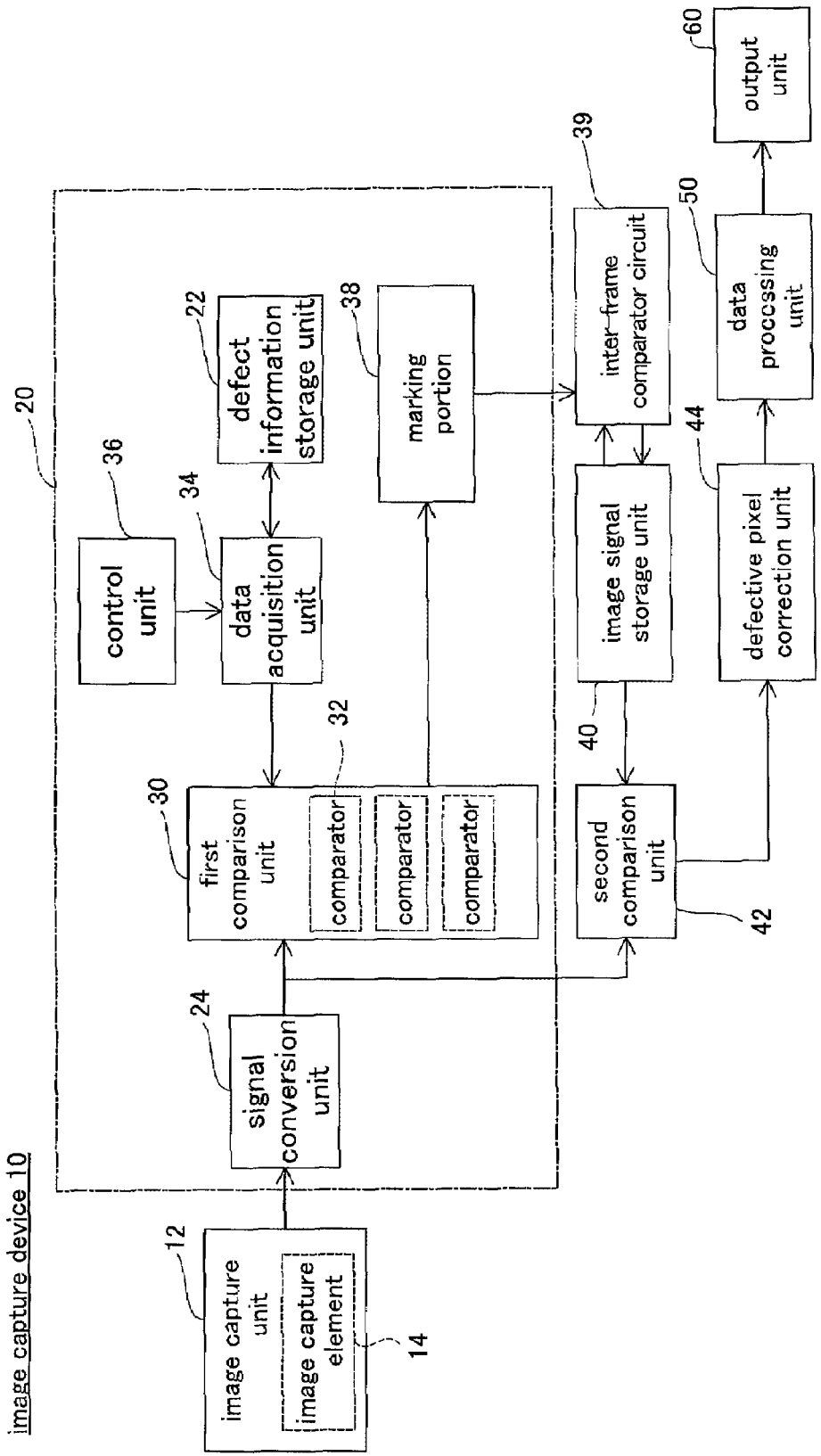
FIG. 1 shows an image capture device according to one embodiment of the present invention.

The image capture unit 12 is furnished with a zoom lens, a focus lens, and an aperture (not shown), and with an image capture element 14 for converting light received via these components into electrical signals. The image capture element 14 is equipped with a plurality of photodetector elements (photo diodes) respectively provided in correspondence with the plurality of pixels that make up the captured images, and is adapted to respectively output pixel data representing a pixel value of the corresponding pixel. The image capture unit 12 is also furnished with an A/D conversion unit, and is adapted to convert the analog signal from the image capture element 14 into a digital signal, e.g. in the case of 8-bit data, to an image signal represented on pixel values of 0 to 255.

The defective pixel establishing unit 20 is a circuit for the purpose of extracting defective pixel data to the image signal storage unit 40, and is furnished with defect information storage unit 22, signal conversion unit 24, first comparison unit 30, a data acquisition unit 34, a control unit 36, and a marking unit 38.

Figure 2:
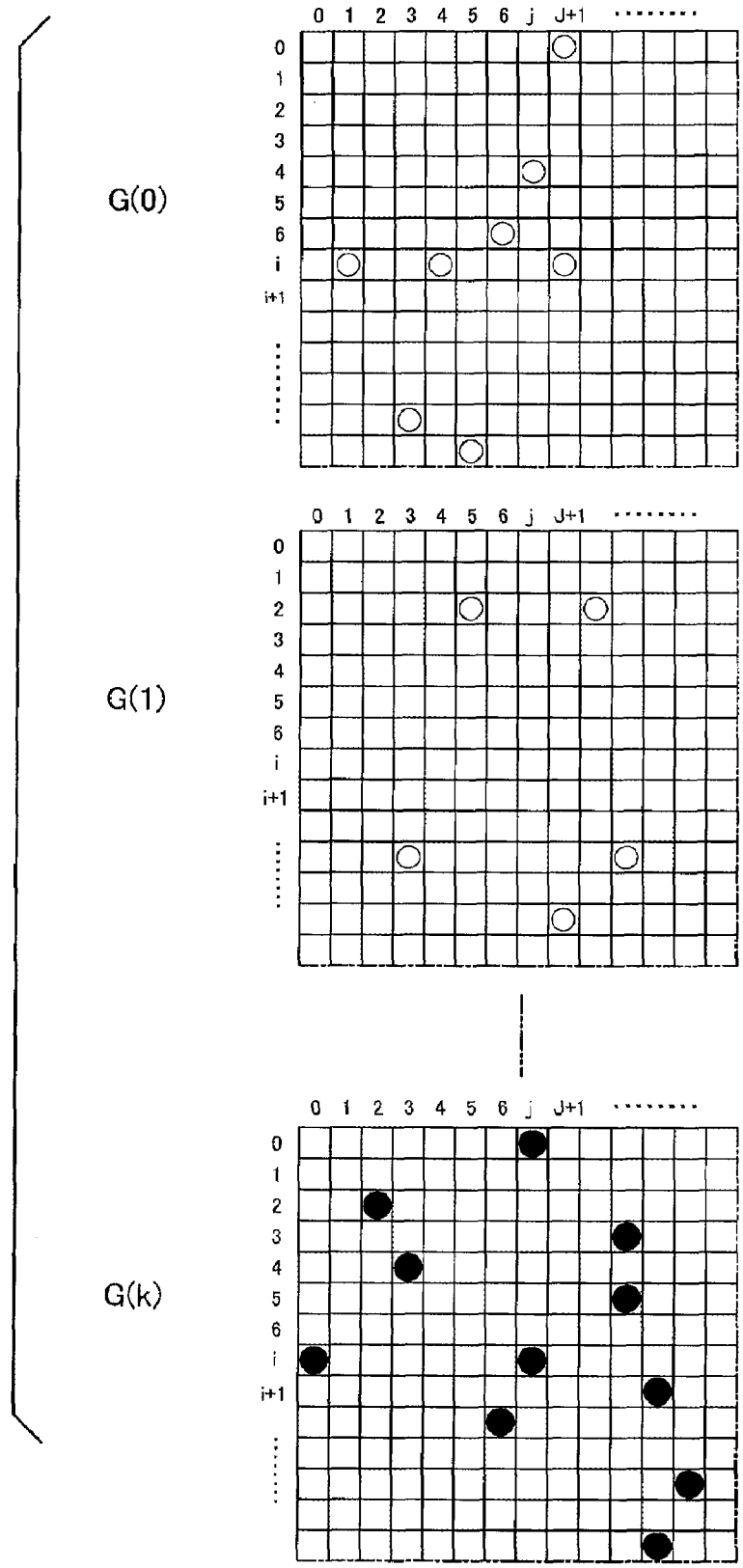
FIG. 2 shows defective pixel data.

In the defect information storage unit 22 there is stored in advance defective pixel data that represents defective pixels of the image capture element 14 composed for example of a number n (where n is an integer equal to or more than two) of pixels, and that has been saved in the form of addresses and defective values of the image capture element 14. The defective values can be set such that, where the image signal is an 8-bit signal that assumes values between 0 and 255, dark defects will be assigned a value of "0" and bright defects will be assigned a value of "255"; the value will be stored together with the address of the image capture element 14 which was obtained during scanning beforehand. FIG. 2 is an illustration depicting defective pixel data. Where the defective pixel data includes 1000 items for example, these will be divided in frame units into groups of n (e.g. of 20) each, and stored in the defect information storage unit 22 such that they can be read out in individual groups Gk (where k is a positive integer 0, 1, 2, . . . i, . . . n). In FIG. 2, for the three groups G(0), G(1), . . . G(k), the black circles indicate dark defects and the white circles indicate bright defects associated with particular addresses AD (i, j) of the image capture element 14. Here, the groups G have been created such that they can be read out sequentially starting with sensing element 14 defects with higher luminance values, i.e. going from obviously defective bright defects to dark defects.

The signal conversion unit 24 depicted in FIG. 1 converts the initial pixel values (values of 0 to 255) of the 8-bit image signal output by the image capture unit 12 to corrected pixel values from which the defective values "0" and "255" have been excluded. Specifically, whereas a signal of a level corresponding to a value of "255" or "0" which is not actually a bright defect or a dark defect but which is equivalent to a bright defect or a dark defect will sometimes be output as the image signal output by the image capture unit 12, these values will be modified to values of "254" and "1".

The first comparison unit 30 is furnished with a plurality, e.g. a number m ($1 \leq m < n$), of series-connected comparators 32. Each comparator 32 holds a single address, and will output an ON signal when the address in question matches the address of the image signal input from the signal conversion unit 24. The control unit 36 will instruct the data acquisition unit 34 to successively read the defective pixel data from the defect information storage unit 22. Based on the instruction of the control unit 36, the data acquisition unit 34 will extract the group G(0) of the defective pixel data of FIG. 2 to the comparators 32 of the first comparison unit 30; and when reading of the pixel signal of one frame has been completed, will then extract the next group G(1) of defective pixel data to the comparators 32, subsequently repeating the process until all of the groups G(k) of defective pixel data have been read. When an image signal is determined by a comparator 32 to be an address of defective pixel data, the marking unit 38 will convert the pixel value to a defective value, i.e. when the value is "254" it will convert it to a value of "255", or when the value is "1" it will convert it to a value of "0".

Figure 3:
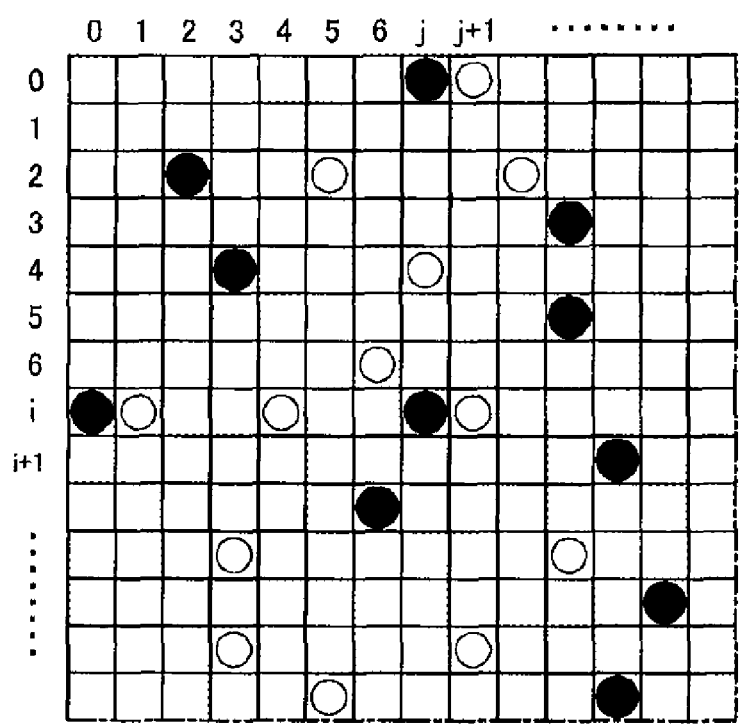
FIG. 3 shows a condition in which all defective pixel data has been saved to an image signal storage unit.

The inter-frame comparator circuit 39 is adapted to store defective values output by the marking unit 38, doing so in frame units saved chronologically and in order of address. The defective values saved to the inter-frame comparator circuit 39 will be stored in such a way that the defective values accumulate in the image signal storage unit 40 by being compared with the image signal storage unit 40 on an individual frame-by-frame basis. FIG. 3 is an illustration depicting a condition in which all defective pixel data has been saved to the image signal storage unit 40. At completion of processing of each individual frame, the defective pixel data shown in FIG. 2 will have been accumulated as groups G(0), G(1), . . . G(k). The second comparison unit 42 will then perform a comparison, chronologically and in order of address, of the defective values that have been saved to the image signal storage unit 40 and the image signal being output by the image capture element 14; and if the pixel signal at the address in question is a defective value, will output the image signal after first modifying it to the defective value.

The defective pixel correction unit 44 is a circuit that is adapted to correct defective pixel data using a known method, for example, on the basis of pixel data of neighboring pixels.

(2) Operation of Image Capture Device 10

Next, the series of operations of the image capture device 10 will be discussed. In FIG. 1, once the image capture device 10 is started up, the control unit 36 of the defective pixel establishing unit 20 will instruct the data acquisition unit 34 so that the data acquisition unit 34 reads the defective pixel data that has been saved beforehand in the defect information storage unit 22 and that includes addresses and defective values of the image capture element 14, and extracts the data to the comparators 32 of the first comparison unit 30. At this time, the individual comparators 32 will store the defective pixel data shown by group G(1) of FIG. 2. Meanwhile, the image signal from the image capture device 10 will be input to the signal conversion unit 24. If an image signal has a value that was established by a defective value, the signal conversion unit 24 will modify the value to a different one before outputting it to the first comparison unit 30. Specifically, among the pixel values (values of 255 to 0) of the 8-bit digital signal output by the image capture unit 12, the signal conversion unit 24 will convert values of "255" to values of "254" and values of "0" to values of "1" respectively, to obtain pixels values from which values of "255" and values of "0" which are equivalent to bright defects and dark defects have been excluded.

On the basis of the extracted defective pixel data and the image data input from the signal conversion unit 24, the comparators 32 of the first comparison unit 30 will sequentially compare the addresses of the data to determine if these match, and if determined to match the marking unit 38 will modify the pixel value of the image data of the signal conversion unit 24 to a defective value, i.e. modified from "254" to "255" or from "1" to "0". The defective values from the marking unit 38 will be sent to the inter-frame comparator circuit 39. The inter-frame comparator circuit 39 will then perform comparison with the image signal storage unit 40 on an individual frame-by-frame basis, and will save the defective values to the image signal storage unit 40 chronologically and in order of address. When one single frame process finishes, in response to an instruction from the control unit 36 the data acquisition unit 34 will extract the next defective pixel data group G(1) from the defect information storage unit 22 to the comparators 32, and will similarly save the defective value data to the image signal storage unit 40 on the basis of the output of the comparators 32. Once the data of groups up through the defective pixel data group G(k) has been stored to the image signal storage unit 40, the control unit 36 will stop reading the defective pixel data. At this time, the defective pixel data shown in FIG. 3 will have been stored in order of address in the image signal storage unit 40. Meanwhile, the second comparison unit 42 will perform a comparison, chronologically and in order of address, of the pixel values output by the signal conversion unit 24 and the defective values that have been stored in the image signal storage unit 40; and when there is a defective value at a given address, will modify the pixel value from the signal conversion unit 24 to a defective value and output the result to the defective pixel correction unit 44, i.e. it will modify the pixel value from the signal conversion unit 24 to "255" or to "0", then output the result to the data processing unit 50. The data processing unit 50 will then perform correction of the defective pixel data using a known method, for example, based on pixel data of neighboring pixels.

(3) Working Effects of the Embodiment

The image capture device 10 according to the present embodiment affords the following working effects.

(3)-1 The first comparison unit 30 extracts the defective pixel data which has been recorded to the defect information storage unit 22, doing so in several increments rather than extracting the data to the comparators 32; accordingly, there is no need to provide the comparators 32 with comparator 32 determination circuits equal in number to the number of defective pixel data items, so their design can be made simple.

(3)-2 Because a comparison process by the first comparison unit 30, which would require prolonged processing time proportional to the number of defective pixel data items, does not take place subsequent to completion of saving of the defective pixel data to the image signal storage unit 40, that is, since a process whereby the second comparison unit 42 alone compares chronologically and in order of address the defective values that have been saved to the aforementioned image signal storage unit with the pixel values of the image signal output by the aforementioned image capture element 14 will suffice, delay in signal process of the image signal can be reduced, and picture quality improved.

(4) Other Embodiments

This invention is not limited to the embodiment set forth hereinabove, and may be reduced to practice in various other modes without departing from the spirit thereof, as exemplified by the following possible modifications.

(4)-1 The defective pixel data which has been stored in the defect information storage unit 22 may be grouped so as to be read out sequentially from the center towards the perimeter of the image which is displayed by the display elements. By so doing, correction will take place sequentially towards perimeter locations, starting from the highly visible center location of the image displayed by the image capture device, thereby obtaining a clean image with no highly visible defects at startup.

(4)-2 In the present embodiment, CCDs and CMOS sensors may be given by way of examples of the image capture element. In the image capture element, the photodetectors may be arrayed in a matrix arrangement, or arrayed in a honeycomb arrangement.

(4)-3 Where the present invention is constituted as a computer program or a recording medium having such a program recorded thereon, it may take the form of the entire program for controlling operations of the defective pixel detection device or the image capture device, or constitute only those units for accomplishing the functions of the present invention. Examples of recording media are flexible disks, CD-ROM, DVD-ROM, magneto-optical disks, IC cards, ROM cartridges, punch cards, printed matter imprinted with bar codes or other symbols, computer internal storage devices (memory such as RAM and ROM) and external storage devices, and other such computer-readable media.

The foregoing detailed description of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the spirit and scope of the appended claims.

What is claimed is:

1. An image capture device comprising:
an image capture unit having an image capture element for capturing a subject, and adapted to output an image signal with pixel values output by the image capture element in a form associated with addresses of pixels included in the image capture element;

a pixel address storage unit adapted to store a number n of addresses in the image capture element, where n is an integer equal to or more than two;

a number m of comparators adapted to acquire the stored n addresses in multiple increments of m, and during each acquisition to repeatedly carry out a comparison process for comparison of the m addresses with the addresses of the image signal output by the image capture unit, for the image signal of at least one frame, where $1 \leq m < n$; and an image signal storage unit adapted to save default values as values lying out of range of the pixel values output by the image capture element and as image data of at least one frame, wherein the default values are values in which the m comparators determine that addresses saved in the comparators match addresses of the image signal captured by the image capture element until acquisition of the n addresses has been completed.

2. A defective pixel detection device for an image capture device comprising:

an image capture unit having an image capture element for outputting a first image signal taken of a subject;

a defect information storage unit adapted to store defective pixel data representing defective pixels of the image capture element in advance, wherein the defective pixel data is in the form of address and defective value of the image capture element;

a signal conversion unit adapted to convert a first pixel value of the first image signal to a second pixel value of a second image signal, wherein the second pixel value excludes the defective value;

a first comparison unit having comparators, wherein each of the comparators loads and extracts the defective pixel data stored in the defect information storage unit respectively, and then compares the extracted defective pixel data with the second image signal of the signal conversion unit, and converts the second pixel value of the second image signal to the defective value when the second image signal matches the defective pixel data;

an image signal storage unit adapted to save the defective value output from the first comparison unit in frame units chronologically and in order of address; and a second comparison unit adapted to carry out a comparison process, in which the second comparison unit compares chronologically and in order of address between the defective value stored in the image signal storage unit and the second pixel value of the second image signal, and converts the second pixel value to the defective value when the second pixel value mates the defective value at each of the address;

wherein the first comparison unit carries out a default data setting process, in which the first comparison unit acquires the defective pixel data in frame units and in multiple increments from the defect information storage unit, and upon completion of acquisition and comparison process of all the defective pixel data, the first comparison unit halts comparison of the second image signal data with the defective pixel data, and in sequence of the default data setting process, the second comparison unit carries out the comparison process.

3. The defective pixel detection device for an image capture device in accordance with claim 2 wherein the defective pixel data saved to the defect information storage unit is divided into groups based on luminance value, being read out sequentially, from higher luminance values.

4. A marking device comprising:

an image capture unit having an image capture element for outputting a first image signal taken of a subject;

a marking information storage unit adapted to store making data representing marking pixels of the image capture element in advance, wherein the making data is in the form of address and marking values of the image capture element;

a signal conversion unit adapted to convert a first pixel value of the first image signal to a second pixel value of a second image signal, wherein the second pixel value excludes the marking values;

a first comparison unit having comparators, wherein each of the comparators loads and extracts the marking data stored in the marking information storage unit respectively, and then compares the extracted marking data with the second image signal of the signal conversion unit, and converts the second pixel value of the second image signal to the marking value when the second image signal matches the marking data;

an image signal storage unit adapted to save the marking value output from the first comparison unit in frame units chronologically and in order of address; and a second comparison unit adapted to carry out a comparison process, in which the second comparison unit compares chronologically and in order of address between the marking value stored in the image signal storage unit and the second pixel value of the second image signal, and converts the second pixel value to the marking value when the second pixel value mates the marking value at each of the address;

wherein the first comparison unit carries out a default data setting process in which the first comparison unit acquires the marking pixel data in frame units and in multiple increments from the defect information storage unit, and upon completion of acquisition and comparison process of all the marking pixel data, the first comparison unit halts comparison of the second image signal data with the marking pixel data, and in sequence of the default data setting process, the second comparison unit carries out the comparison process.

5. An image processing method for an image capture device including an image capture unit having an image capture element for capturing a subject, and outputting an image signal with pixel values output by the image capture element in a form associated with addresses of pixels of included in the image capture element, the method comprising:

storing a number n of addresses in the image capture element, where n is an integer equal to or more than two;

acquiring the stored n addresses in a number m of comparators in multiple increments of m, repeatedly carrying out a comparison process for comparison of the m addresses with the addresses of the image signal output by the image capture unit, for the image signal of at least one frame, during each acquisition, where $1 \leq m < n$; and saving default values as values lying out of range of the pixel values output by the image capture element and as image data of at least one frame in an image signal storage unit, wherein the default values are values in which the m comparators determine that addresses saved in the comparators match addresses of the image signal captured by the image capture element until acquisition of the n addresses has been completed.

6. A image processing method for an image capture device including an image capture unit having an image capture element for outputting a first image signal taken of a subject; the method comprising:

storing defective pixel data representing defective pixels of the image capture element in advance in a defect information storage unit, wherein the defective pixel data is in the form of address and defective value of the image capture element;

converting a first pixel value of the first image signal to a second pixel value of a second image signal in a signal conversion unit, wherein the second pixel value excludes the defective value;

loading and extracting the defective pixel data stored in the defect information storage unit respectively in comparators of a first comparison unit comparing the extracted defective pixel data with the second image signal of the signal conversion unit converting the second pixel value of the second image signal to the defective value by the comparators when the second image signal matches the defective pixel data;

saving the defective value output from the first comparison unit in frame units chronologically and in order of address in an image signal storage unit; and carrying out a comparison process, in which the second comparison unit compares chronologically and in order of address between the defective value saved in the image signal storage unit and the second pixel value of the second image signal, and converts the second pixel value to the defective value when the second pixel value mates the defective value at each of the address by a second comparison unit;

wherein carrying out a defect data setting process for the first comparison unit, in which the first comparison unit acquires the defective pixel data in frame units and in multiple increments from the defect information storage unit, and upon completion of acquisition and comparison process of all the defective pixel data, the first comparison unit halts comparison of the second image signal data with the defective pixel data, and in sequence of the defect data setting process, carrying out the comparison process for the second comparison unit.

\* \* \* \* \*